(12) United States Patent
Nammi et al.

(10) Patent No.: US 11,356,161 B2
(45) Date of Patent: *Jun. 7, 2022

(54) MULTIPLE-INPUT MULTIPLE-OUTPUT SYSTEM PERFORMANCE USING ADVANCED RECEIVERS FOR 5G OR OTHER NEXT GENERATION NETWORKS

(71) Applicant: AT&T Intellectual Property I, L.P., Atlanta, GA (US)

(72) Inventors: SaiRamesh Nammi, Kista (SE); Arunabha Ghosh, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/865,931

(22) Filed: May 4, 2020

(65) Prior Publication Data

US 2020/0266868 A1  Aug. 20, 2020

Related U.S. Application Data

(63) Continuation of application No. 16/367,938, filed on Mar. 28, 2019, now Pat. No. 10,686,508.

(Continued)

(51) Int. Cl.
*H04B 7/06* (2006.01)
*H04B 7/08* (2006.01)
(Continued)

(52) U.S. Cl.
CPC ......... *H04B 7/0626* (2013.01); *H04B 7/0882* (2013.01); *H04B 17/336* (2015.01); *H04L 1/0026* (2013.01); *H04L 1/203* (2013.01)

(58) Field of Classification Search
CPC .. H04B 7/0632; H04B 7/0626; H04B 17/336; H04L 1/0026; H04L 1/203; H04L 25/03923
See application file for complete search history.

(56) References Cited

U.S. PATENT DOCUMENTS 8,432,873 B2  4/2013  Luo et al.
8,917,665 B2  12/2014 Seo et al.
(Continued)

FOREIGN PATENT DOCUMENTS

| CN | 104639279 A | 5/2015 |
| WO | 2011045024 A1 | 4/2011 |
| WO | 2017096954 A1 | 6/2017 |

OTHER PUBLICATIONS

Non-Final Office Action received for U.S. Appl. No. 16/367,938 dated Oct. 17, 2019, 33 pages.
(Continued)

*Primary Examiner* — Aristocratis Fotakis
(74) *Attorney, Agent, or Firm* — Amin, Turocy & Watson, LLP

(57) ABSTRACT

Fast calculation of channel state information using demodulation reference signals (DM-RS) is provided herein. The channel state information can be calculated by estimating the signal to noise ratio of a communication link based on the DM-RS, and then estimating the channel quality indicator based on the SINR. The advanced receivers can use list-based detection methods which the estimated SINR can improve the performance thereof. Channel state information is traditionally calculated based on the channel state reference signals (CS-RS). Demodulation reference signals, which are used for channel estimation for a data channel, are transmitted at different times than CS-RS however, and so some portions of the channel state information including layer indicator (LI) and channel quality indicator (CQI) can be calculated based on the demodulation reference signals, allowing a network to adapt more quickly to changing channel conditions, without having to transmit a CS-RS.

20 Claims, 12 Drawing Sheets

Related U.S. Application Data

(60) Provisional application No. 62/717,366, filed on Aug. 10, 2018.

(51) Int. Cl.
 *H04L 1/00* (2006.01)
 *H04B 17/336* (2015.01)
 *H04L 1/20* (2006.01)

(56) References Cited

U.S. PATENT DOCUMENTS

| | | | |
|---|---|---|---|
| 9,722,749 | B2 | 8/2017 | Seo et al. |
| 9,973,225 | B1* | 5/2018 | Jalloul .................. H04B 1/1027 |
| 9,991,939 | B2 | 6/2018 | Mundarath et al. |
| 2010/0075672 | A1* | 3/2010 | Jwa ....................... H04L 1/0027 |
| | | | 455/434 |
| 2011/0128909 | A1 | 6/2011 | Luo et al. |
| 2012/0230290 | A1 | 9/2012 | Seo et al. |
| 2013/0143578 | A1* | 6/2013 | Lekutai ........... H04W 36/00837 |
| | | | 455/444 |
| 2014/0072022 | A1* | 3/2014 | Medles ................ H04B 17/391 |
| | | | 375/227 |
| 2014/0226554 | A1 | 8/2014 | Wang et al. |
| 2015/0180632 | A1 | 6/2015 | Kishiyama et al. |
| 2015/0271755 | A1* | 9/2015 | Karri .................. H04W 28/0221 |
| | | | 370/252 |
| 2016/0020847 | A1* | 1/2016 | Jitsukawa ............. H04W 16/28 |
| | | | 370/329 |
| 2016/0100411 | A1 | 4/2016 | Kuchi |
| 2016/0353424 | A1 | 12/2016 | Stirling-Gallacher et al. |
| 2017/0111133 | A1 | 4/2017 | Yoshimoto et al. |
| 2017/0126380 | A1 | 5/2017 | Kim et al. |
| 2017/0289899 | A1* | 10/2017 | You ....................... H04W 88/08 |
| 2018/0013478 | A1* | 1/2018 | Chen .................... H04L 5/0051 |
| 2018/0278364 | A1 | 9/2018 | Sandberg et al. |
| 2019/0069193 | A1* | 2/2019 | Astrom ............... H04W 52/028 |
| 2019/0097750 | A1 | 3/2019 | Sandberg et al. |
| 2019/0349057 | A1 | 11/2019 | Davydov et al. |

OTHER PUBLICATIONS

Notice of Allowance received for U.S. Appl. No. 16/367,938 dated Feb. 5, 2020, 28 pages.

\* cited by examiner

MULTIPLE-INPUT MULTIPLE-OUTPUT SYSTEM PERFORMANCE USING ADVANCED RECEIVERS FOR 5G OR OTHER NEXT GENERATION NETWORKS

RELATED APPLICATIONS

The subject patent application is a continuation of, and claims priority to each of, U.S. patent application Ser. No. 16/367,938 (now U.S. Pat. No. 10,686,508), filed Mar. 28, 2019, and entitled "IMPROVED MULTIPLE-INPUT MULTIPLE-OUTPUT SYSTEM PERFORMANCE USING ADVANCED RECEIVERS FOR 5G OR OTHER NEXT GENERATION NETWORKS," which further claims the benefit of priority to U.S. Provisional Patent Application No. 62/717,366, filed Aug. 10, 2018 and titled "IMPROVED MIMO SYSTEM PERFORMANCE USING ADVANCED RECEIVERS IN A 5G WIRELESS COMMUNICATION SYSTEM," the entireties of which applications are incorporated herein by reference.

TECHNICAL FIELD

This disclosure relates generally to facilitating reporting sub-band channel quality. For example, this disclosure relates to facilitating reporting sub-band channel quality data to perform frequency selective scheduling for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to improved MIMO system performance is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
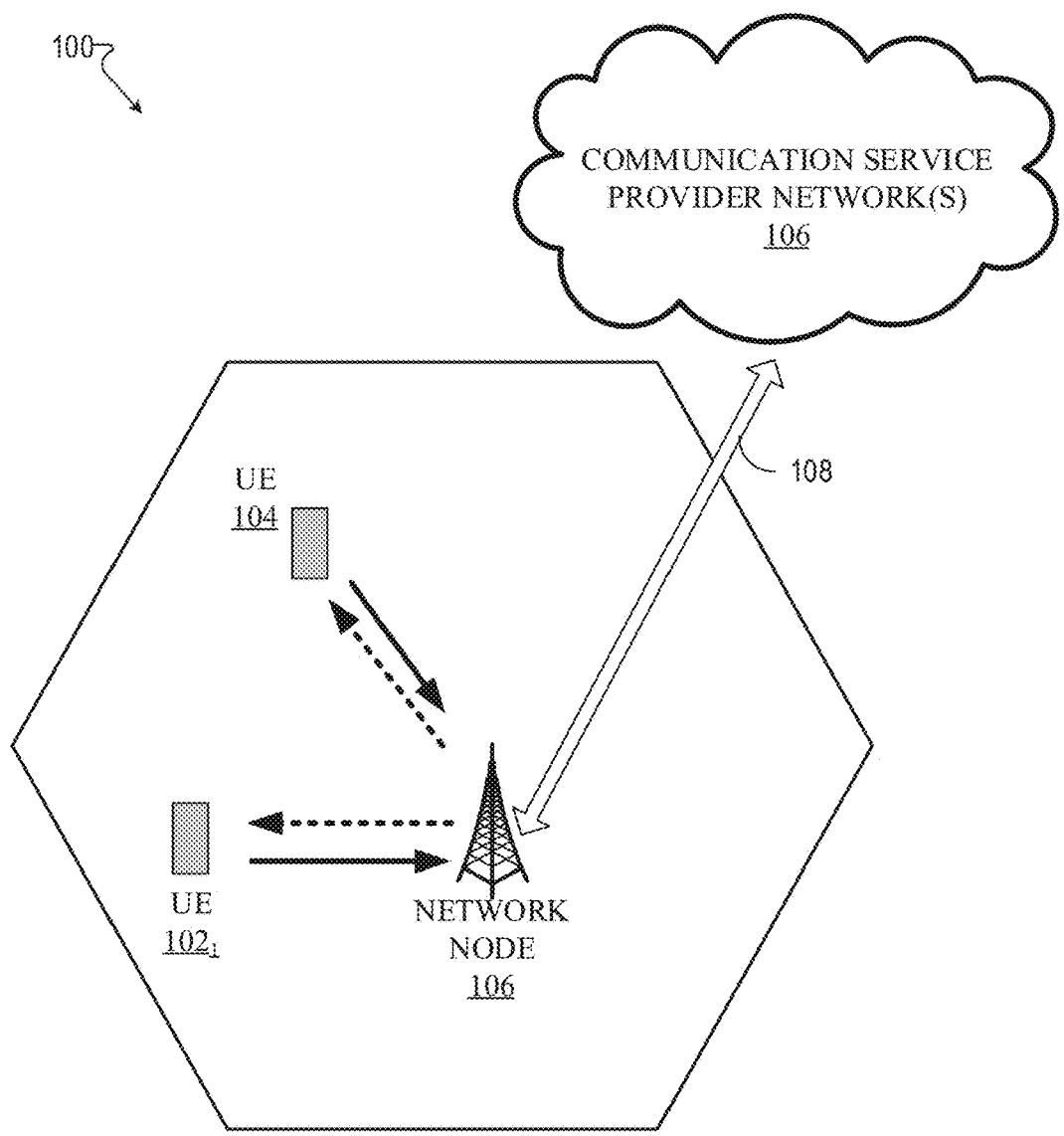
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate improved MIMO system performance for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate improved MIMO system performance for frequency selective scheduling for a 5G network. Facilitating improved MIMO system performance for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

A physical downlink control channel (PDCCH) can carry information about scheduling grants. Typically, this comprises a of number of multiple-in multiple-out (MIMO) layers scheduled, transport block sizes, modulation for each code word, parameters related to a hybrid automatic repeat request (HARQ), sub band locations etc. It should be noted that all downlink control information (DCI) formats may not transmit all the information as shown above. In general, the contents of PDCCH can depend on a transmission mode and a DCI format. Typically, the following information is transmitted by means of the DCI format: carrier indicator, identifier for dci formats, bandwidth part indicator, frequency domain resource assignment, time domain resource assignment, virtual resource block (VRB) to physical resource block (PRB) mapping flag, PRB bundling size indicator, rate matching indicator, zero-punctuation (ZP) CSI-RS trigger, modulation and coding scheme for each transport block (TB), new data indicator for each TB, redundancy version for each TB, HARQ process number, downlink assignment index, transaction processing benchmark (TPC) command for uplink control channel, physical uplink control channel (PUCCH) resource indicator, physical downlink scheduling channel to HARQ feedback timing indicator, antenna port(s), transmission configuration indication, system requirement specification (SRS) request, code block group (CBG) transmission information, CBG flushing out information, and/or demodulation reference signal (DMRS) sequence initialization.

The uplink control channel can carry information about HARQ-acknowledgment (ACK) information corresponding to the downlink data transmission, and channel state information. The channel state information typically comprise: CRI, RI, CQI, PMI and layer indicator data, etc. The CSI can be divided into two categories: one for sub-band and the other for wideband. The configuration of sub-band or wideband CSI reporting can be done through RRC signaling as part of CSI reporting configuration. Table 1 depicts the contents of a CSI report for PMI format indicator=Wideband, CQI format indicator=wideband and for PMI format indicator=sub-band, CQI format indicator=sub-band.

TABLE 1

Contents of CSI report for both wideband and side band

| PMI-Format Indicator = wideband PMI and CQI-Format Indicator = wideband CQI | PMI-Format Indicator = sub-band PMI or CQI-Format Indicator = sub-band CQI | | |
|---|---|---|---|
| | | CSI Part II | |
| | CSI Part I | wideband | sub-band |
| CRI | CRI | Wideband CQI for the second TB | Sub-band differential CQI for the second TB (transport block) of all even sub-bands |
| Rank Indicator | Rank Indicator | PMI wideband (X1 and X2) | PMI sub-band information fields $X_2$ of all even sub-bands |
| Layer Indicator | Layer Indicator | — | Sub-band differential CQI for the second TB of all odd sub-bands |
| PMI wideband (X1 and X2) | Wideband CQI | — | PMI sub-band information fields $X_2$ of all odd sub-bands |
| Wideband CQI | Sub-band differential CQI for the first TB | — | — |

Note that for NR, the sub-band is defined according to the bandwidth part of the OFDM in terms of PRBs as shown in Table 2. The sub-band configuration is also done through RRC signaling.

TABLE 2

Configurable sub-band sizes

| Carrier bandwidth part (PRBs) | Sub-band Size (PRBs) |
|---|---|
| <24 | N/A |
| 24-72 | 4, 8 |
| 73-144 | 8, 16 |
| 145-275 | 16, 32 |

According to the existing 5G NR standard, the UE should report sub-band CQI as a differential CQI to reduce the uplink overhead. The differential sub-band CQI can be defined. As each sub-band index s, a 2-bit sub-band differential CQI can be defined as sub-band offset level (s)=wideband CQI index−sub-band CQI index (s). The mapping from the 2-bit wideband differential CQI values to the offset level is shown in Table 3.

TABLE 3

Mapping sub band differential CQI value to offset level

| Sub band differential CQI value | Offset level |
|---|---|
| 0 | 0 |
| 1 | 1 |

TABLE 3-continued

Mapping sub band differential CQI value to offset level

| Sub band differential CQI value | Offset level |
|---|---|
| 2 | ≥2 |
| 3 | ≤−1 |

As mentioned in the above sections, even though the UE can transmit feedback either wideband CQI and wideband precoding matrix index (PMI), or sub-band CQI and sub-band precoding matrix index based on the RRC configuration of CSI reporting, when the UE is configured to report sub-band PMI and sub-band CQI, the UE can report two bits for each sub-band and reports differential CQI as in Table 3.

To report sub-band differential CQI from the UE, the network can provide an offset value (Diff_offset) to the UE. After receiving this value, the UE can report the sub-band differential CQI according to the table 4. For each sub-band index s, a log 2 (N+2)-bit sub-band differential CQI can be defined as:

$$\text{Sub-band Offset level }(s)=\text{wideband CQI index}-\text{sub-band CQI index }(s) \quad \text{Equation (1):}$$

The following Table 4 summarizes the CSI-RS configuration and the CSI reporting. It can be observed that for CSI reporting a CSI-RS transmission and signaling from the network to the UE can be utilized.

TABLE 4

Triggering/Activation of CSI Reporting for Possible CSI-RS Configurations

| CS-RS Configuration | Periodic CSI Reporting | Semi-Persistent CSI Reporting | Aperiodic CSI Reporting |
|---|---|---|---|
| Periodic CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | Not Supported | Triggered by DCI; additionally, activation command possible as defined in Subclause 5.2.1.5.1. |
| Aperiodic CSI-RS | | | |

The CSI can be computed by using the scheduled PDSCH and DMRS using advanced receivers. For example, an advanced receiver can decode the PDSCH data and compute the CSI using an estimated signal interference to noise ratio (SINR). This disclosure comprises multiple embodiments, which can be implemented at the receiver node either in UE downlink MIMO or at the network uplink MIMO. Consequently, various advantages can be realized. For example, significant gains can be realized in sector throughput and cell edge user throughput as the network obtains the information about the CQI by efficiently using the advanced receivers. Although various embodiments in this disclosure are described in to downlink data transmissions for MIMO systems, the same principle can be applicable for uplink and side link systems.

Note, for simplicity the radio network node or simply network node is used for gNB. It refers to any type of network node that serves UE and/or connected to other network node or network element or any radio node from where UE receives signal. Similarly, the terms element, elements and antenna ports can also be used interchangeably, yet carry the same meaning in this disclosure. Thus, in general, RI computed over the whole bandwidth does not change. Similarly, the PMI computed over the whole bandwidth does not change as shown FIG. 6.

In one embodiment, described herein is a user equipment device that can receive, by a receiver of the user equipment device that uses list-based detection, a demodulation reference signal to facilitate channel estimation for a data channel of a communication link with a network node device. The user equipment device can estimate a signal to interference plus noise ratio of the communication link. Additionally, the user equipment device can match a channel quality indicator value to the signal to interference plus noise ratio. Furthermore, the user equipment device can transmit the channel quality indicator value to the network node device.

According to another embodiment, a network node device can facilitate determining a signal to interference plus noise ratio of a communication link with a user equipment device. Additionally, the network node device can determine a modulation and coding scheme that corresponds to a block error rate threshold based on the signal to interference plus noise ratio. Furthermore, the network node device can transmit a scheduling parameter that corresponds to the modulation and coding scheme to the user equipment device via a downlink control channel.

According to yet another embodiment, a system can facilitate operations comprising receiving, from a network node device, a demodulation reference signal to facilitate a channel estimation associated with a communication link. Based on the receiving the demodulation reference signal, the system can facilitate generating, by a mobile device, channel state data associated with the communication link. Furthermore, based on the channel state data, the system can facilitate generating, by the mobile device, a channel quality indicator value associated with the communication link.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102, 104. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 106. The network node (e.g., network node device) can communicate with user equipment (UE), thus providing connectivity between the UE and the wider cellular network. The UE 102 can send transmission type recommendation data to the network node 106. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 106. The dashed arrow lines from the network node 106 to the UE 102 represent downlink (DL) communications and the solid arrow lines from the UE 102 to the network nodes 106 represents an uplink (UL) communication.

System 100 can further include one or more communication service provider networks 106 that facilitate providing wireless communication services to various UEs, including UE 102, via the network node 106 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 106 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 106). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102, 104 and the network node 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructure development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
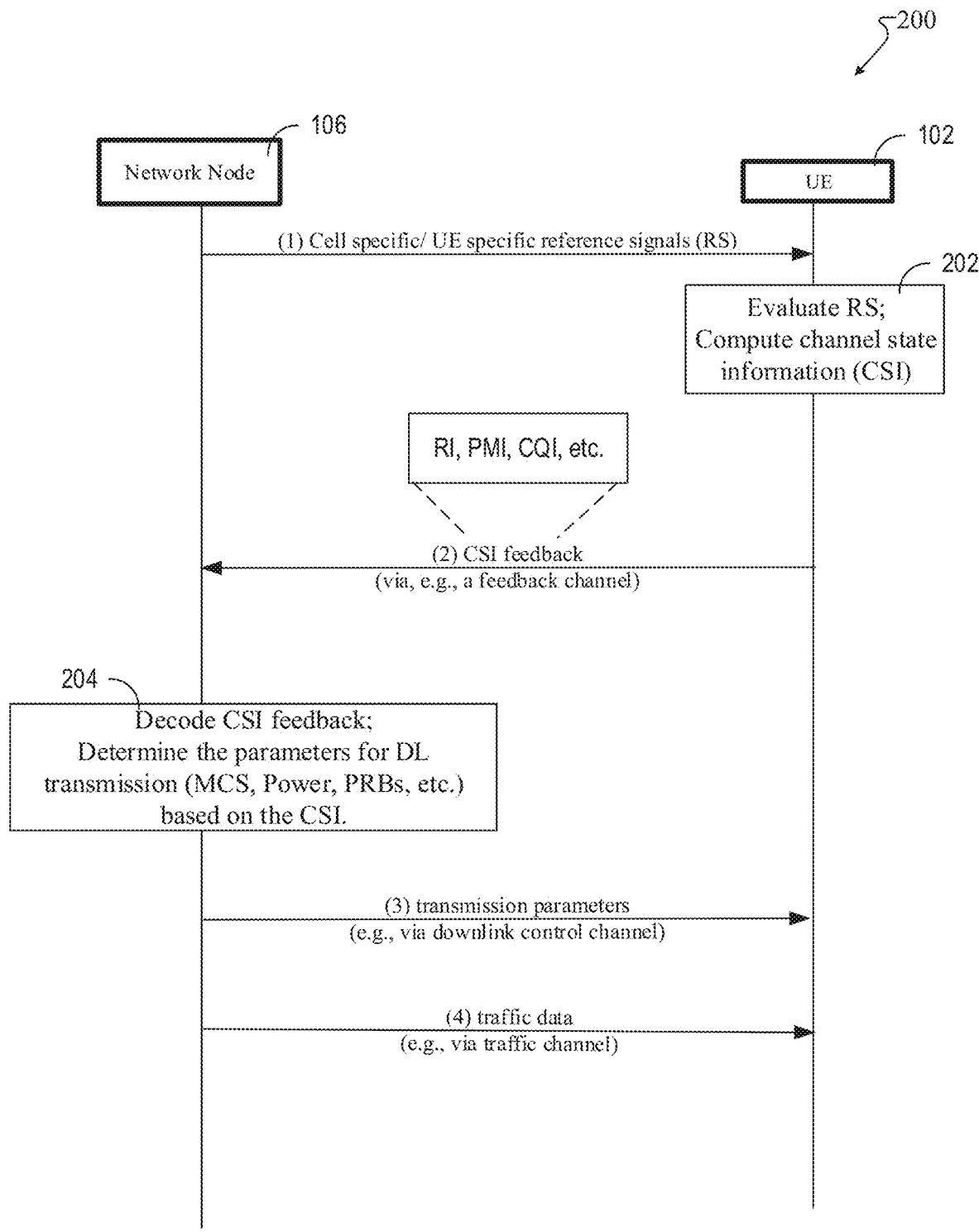
FIG. 2 illustrates an example schematic system block diagram of a message sequence chart between a network node and user equipment according to one or more embodiments.

Referring now to FIG. 2, illustrated is an example schematic system block diagram of a UE in communication with a node device via a system 200. The system 200 comprises a network node (e.g., network node 106), that can transmit a reference signal (RS) at transaction (1), which can be beam formed or non-beam formed, to a user equipment (e.g., UE 102). FIG. 2 illustrates a closed loop transaction diagram (e.g., sequence chart). Briefly described, in this technique, a reference signal is first sent from the network node to the UE. From the reference signals, the UE can compute the channel estimates and the parameters needed for channel state information (CSI) reporting. In LTE, the CSI report can comprise a channel quality indicator (CQI), preceding matrix index (PMI), rank information (RI), etc. The CSI report is sent to the network node via a feedback channel either on a periodic basis or on demand based CSI (e.g., aperiodic CSI reporting). The network node scheduler can use this information to choose the parameters for scheduling of this particular UE. The network node can send the scheduling parameters to the UE on the downlink control channel called the physical downlink control channel (PDCCH). After that, actual data transfer can take place from the network node to the UE on the physical downlink shared channel (PDSCH).

Downlink reference signals are predefined signals occupying specific resource elements within the downlink time-frequency grid. The reference signal can be cell specific or UE specific in relation to a profile of the user equipment 102 or some type of mobile identifier. There are several types of downlink reference signals that are transmitted in different ways and used for different purposes by the receiving terminal. Channel state information reference signals (CSI-RS) are specifically intended to be used by terminals to acquire channel state information (CSI) and beam specific information (beam RSRP). In 5G, CSI-RS is UE specific so it can have a significantly lower time/frequency density. Demodulation reference signals (DM-RS), sometimes referred to as UE-specific reference signals, are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal.

After receiving this reference signal, at block 202, the UE 102 can evaluate the reference signal and compute CSI, which can be transmitted to the network node as CSI feedback (e.g., a CSI report). The CSI feedback can comprise an indicator of channel state information (e.g., known in LTE as a precoding matrix indicator (PMI)), indicator of channel quality (e.g., known in LTE as a channel quality indicator (CQI)), and an indication of rank (e.g., known in LTE as rank indicator (RI)), each of which is discussed further below.

The indicator of channel state information (e.g., PMI in LTE) can be used for selection of transmission parameters for the different data streams transmitted between the network node and the UE. In techniques using codebook-based precoding, the network node and UE use different codebooks, which can be found in standards specifications, each of which relate to different types of MIMO matrices (for example, a codebook of precoding matrices for 2×2 MIMO). The codebook is known (contained) at the node and at the UE site, and can contain entries of precoding vectors and matrices, which are multiplied with the signal in the precoding stage of the network node. The decision as to which of these codebook entries to select is made at the network node based on CSI feedback provided by the UE, because the CSI is known at the receiver, but not at the transmitter. Based on the evaluation of the reference signal, the UE can transmit feedback that comprises recommendations for a suitable precoding matrix out of the appropriate codebook (e.g., points to the index of the precoder in one of the codebook entries). This UE feedback identifying the precoding matrix is called the pre-coding matrix indicator (PMI). The UE is thus evaluating which pre-coding matrix would be more suitable for the transmissions between the network node and UE.

Additionally, the CSI feedback can comprise an indicator of channel quality (e.g., in LTE the channel quality indicator (CQI)), which indicates the channel quality of the channel between the network node and the user equipment for link adaptation on the network side. Depending on which value that a UE reports, the node can transmit data with different transport block sizes. If the node receives a high CQI value from the UE, then it can transmit data with larger transport block size, and vice versa.

Also included in the CSI feedback can be the indicator of rank (rank indicator (RI) in LTE terminology), which provides an indication of the rank of the channel matrix, wherein the rank is the number of different transmission data streams (layers) transmitted in parallel, or concurrently (in other words, the number of spatial layers), between the network node and the UE, as discussed above. The RI determines the format of the rest of the CSI reporting messages. As an example, in the case of LTE, when RI is reported to be 1, the rank-1 codebook PMI will be transmitted with one CQI, and when RI is 2, a rank 2 codebook PMI and two CQIs will be transmitted. Since the RI determines the size of the PMI and CQI, it is separately encoded so the receiver can first decode the RI, and then use the decoded RI to decode the rest of the CSI (which as mentioned, comprises the PMI and CQI, among other information). Typically, the rank indication feedback to the network node can be used to select of the transmission layer in downlink data transmission. For example, even though a system is configured in transmission mode 3 in the LTE specifications (or open loop spatial multiplexing) for a particular UE, and if the same UE reports the indicator of rank value as "1" to the network node, the network node may start sending the data in transmit diversity mode to the UE. If the UE reports a RI of "2," the network node might start sending the downlink data in MIMO mode (e.g., transmission mode 3 or transmission mode 4 as described in the LTE specifications). Typically, when a UE experiences bad signal to noise ratio (SNR) and it would be difficult to decode transmitted downlink data, it provides early warning to the network node in the form of feedback by stating the RI value as "1." When a UE experiences good SNR, then it passes this information to the network node indicating the rank value as "2."

After computing the CSI feedback, the UE 102 can transmit the CSI feedback at transaction (2), via a feedback channel, which can be a channel separate from the channel from which the reference signal was sent. The network node 106 can process the CSI feedback to determine transmission scheduling parameters (e.g., downlink (DL) transmission scheduling parameters), which comprise a modulation and coding parameter applicable to modulation and coding of signals by the network node device particular to the UE 102.

This processing of the CSI feedback by the network node 106, as shown in block 204 of FIG. 2, can comprise decoding the CSI feedback. The UE can decode the RI and then use the decoded information (for example, the obtained size of the CSI) to decode the remainder of the CSI feedback (e.g., the CQI, PMI, etc.). The network node 106 can use the decoded CSI feedback to determine a suitable transmission protocol, which can comprise modulation and coding schemes (MCS) applicable to modulation and coding of the different transmissions between the network node 106 and the UE 102, power, physical resource blocks (PRBs), etc.

The network node 106 can transmit the parameters at transaction (3) to the UE 102 via a downlink control channel. Thereafter and/or simultaneously, at transaction (4), traffic data (e.g., non-control data such as data related to texts, emails, pictures, audio files videos, etc.) can be transferred, via a data traffic channel, from the network node 106 to the UE 102.

Figure 3:
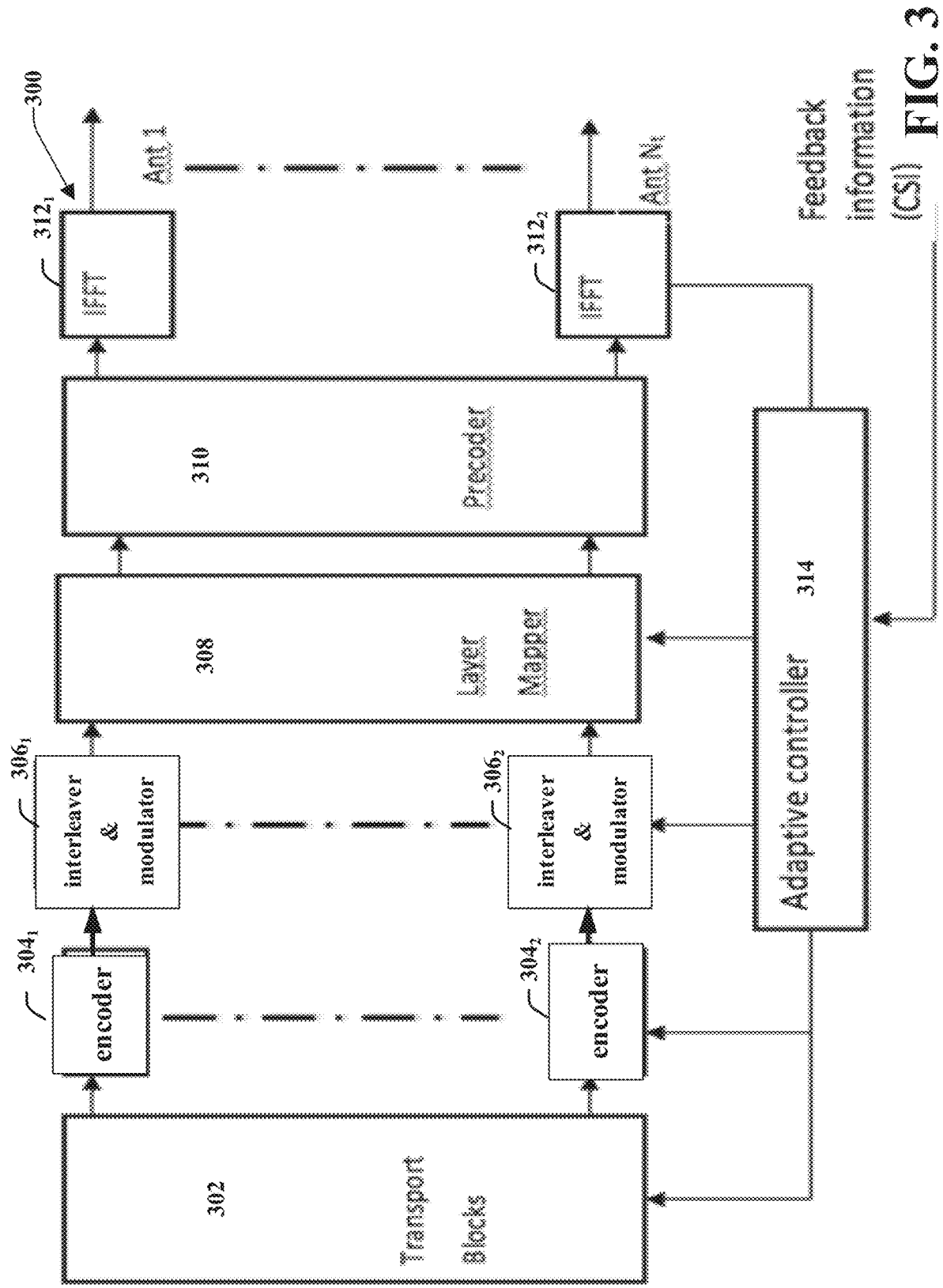
FIG. 3 illustrates an example schematic system block diagram of a multiple code word MIMO transmitter.

Referring now to FIG. 3, illustrated is an example schematic system block diagram of a multiple code word MIMO transmitter. FIG. 3 depicts the transmission side of a MIMO communication system 300 with $N_t$ transmit antennas. There are Nc transport blocks 302, where Nc<=Nt (e.g., the maximum number of transport blocks can be less than the maximum number of transport antennas). CRC bits can be added to each transport block 302 and passed to the channel encoder $304_1$, $304_2$. The channel encoder can add parity bits to protect the data. Then, the stream can be passed through an interleaver & modulator $306_1$, $306_2$. The interleaver can re-arrange the bit positions and the modulator can maps the bits to symbols in a constellation. The interleaver size can be adaptively controlled by an adaptive controller 314 by puncturing (e.g., removing bits in the coded stream, also called rate matching) to increase the data rate. The adaptation can be done by using the information from the feedback channel (e.g., channel state information sent by the receiver). The interleaved data can be passed through a symbol mapper (e.g., modulator) at the interleaver & modulator $306_1$, $306_2$ block. The symbol mapper can also be controlled by the adaptive controller 314. Afterwards the modulator streams can be passed through a layer mapper (e.g., the block where the coded bits are mapped to the number antennas) 308 and a precoder 310. The precoder 310 can generalize any beamforming to support multi-stream transmission the MIMO network. The resultant streams can then be passed through an inverse fast Fourier transform (IFFT) $312_1$, $312_2$ block. It should be understood that the IFFT $312_1$, $312_2$ block can facilitate some communication systems, which implements OFDMA as the access technology (e.g., 5G, LTE/LTE-A), and in other systems it can be different and can be dependent on the multiple access system. The encoded stream can then be transmitted through a respective antenna.

Figure 4:
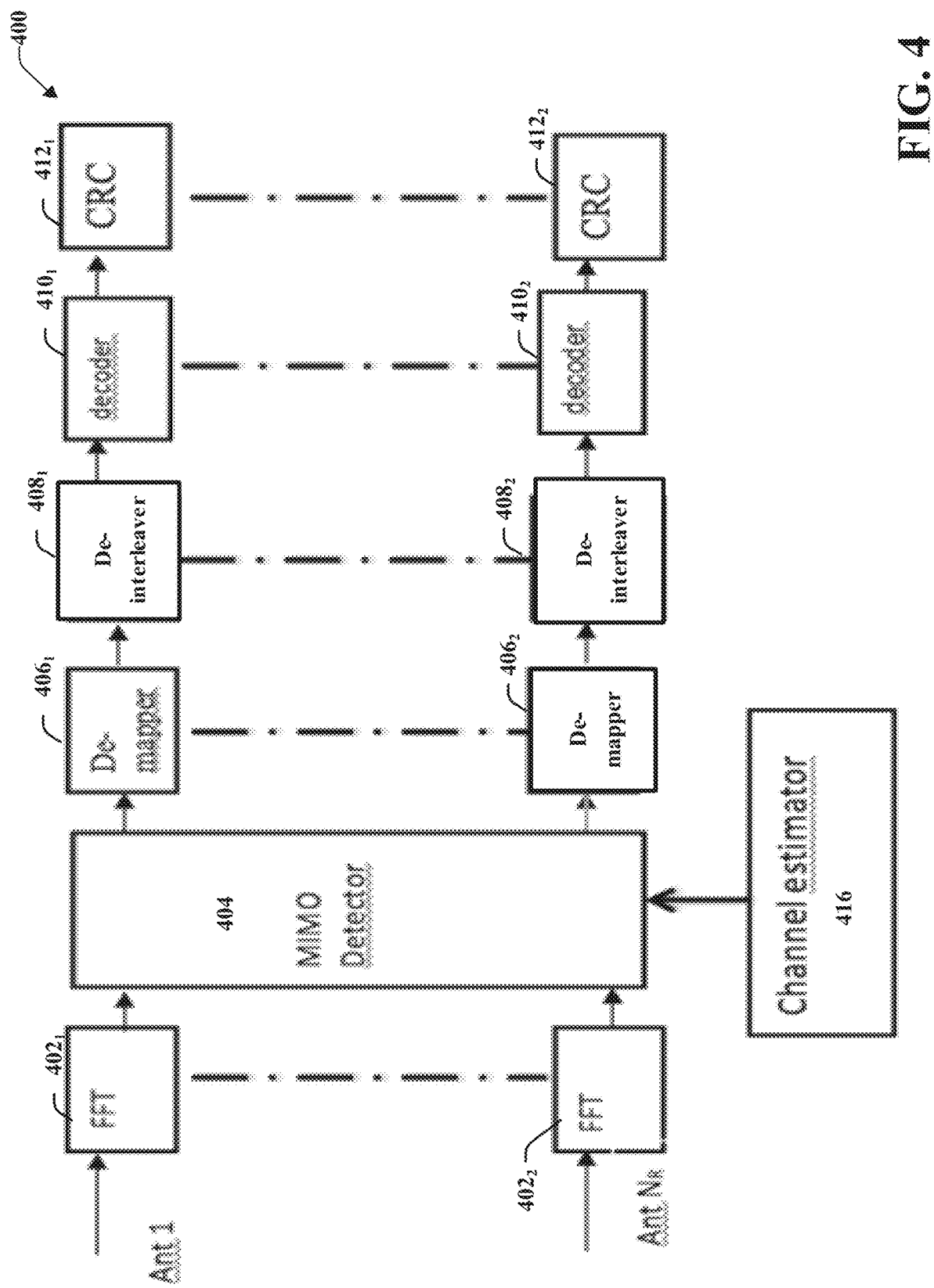
FIG. 4 illustrates an example schematic system block diagram of a multiple codeword MIMO receiver without codeword interference cancellation.

Referring now to FIG. 4, illustrated is an example schematic system block diagram of a multiple codeword MIMO receiver without codeword interference cancellation. FIG. 4 depicts the receiver for the multiple codeword MIMO system 400 without interference cancellation. After a fast Fourier transform (FFT) operation $402_1$, $402_2$, a MIMO detector 404 can be used for reducing multi-antenna interference. A de-mapper $406_1$, $406_2$ can compute the bit log likelihood ratios from the MIMO detector 404 output, which can be in the symbol domain. A channel estimator 416 can estimate channels and then the MIMO detector 404 can use the estimated channels to generate a weight of a minimum mean square error estimation (MMSE) detector. The bit stream can then be de-interleaved by a de-interleaver $408_1$, $408_2$ block and passed to a channel decoder $410_1$, $410_2$. A CRC check can be performed on an output of the channel decoder $410_1$, $410_2$ at a CRC $412_1$, $412_2$ block. If the CRC is passed, a transport block can be considered to be passed, and an ACK can be sent back to a transmitter via a feedback channel. If the CRC fails, then a negative acknowledgment (NAK) can be sent back to the transmitter using the feedback channel.

Figure 5:
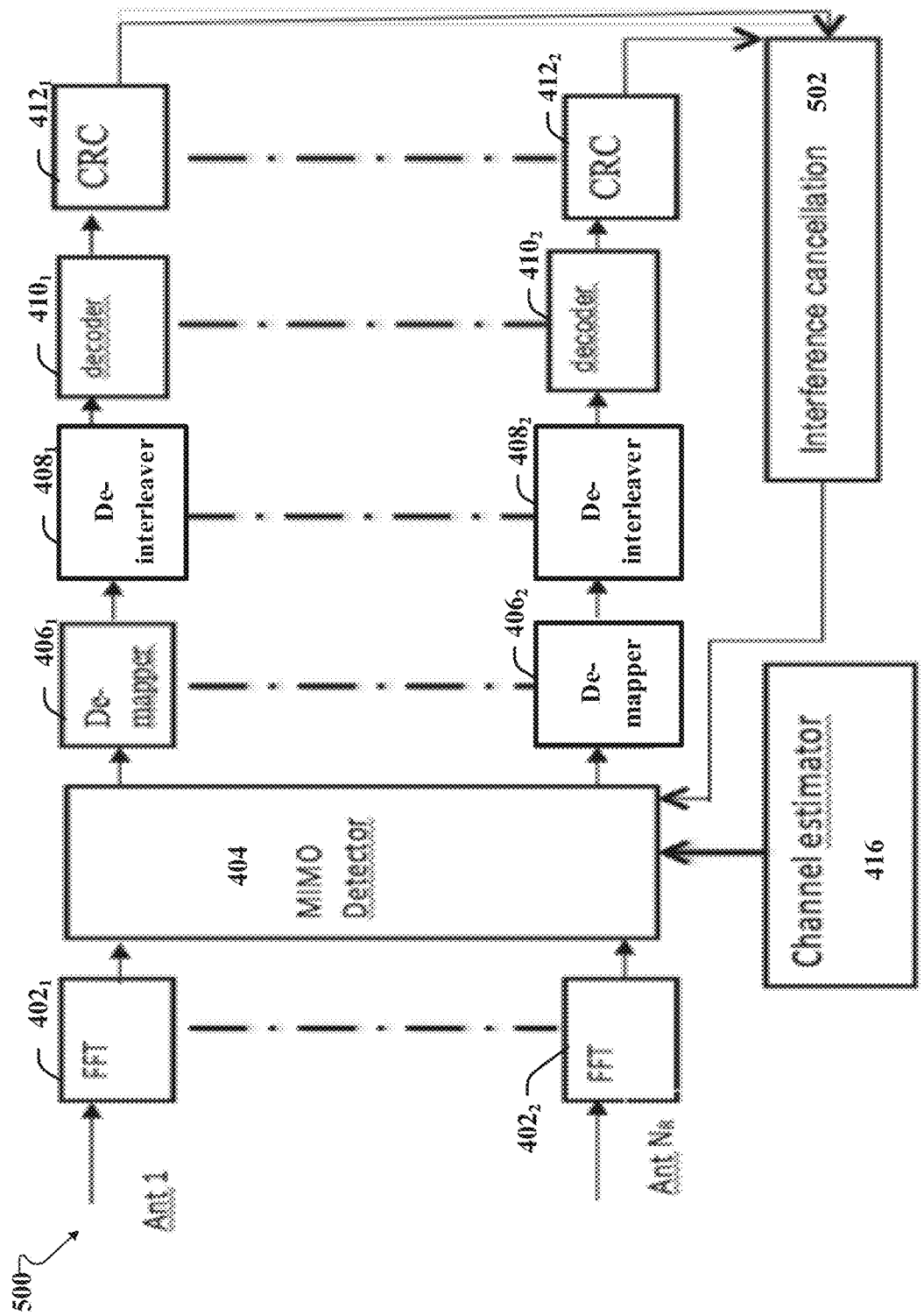
FIG. 5 illustrates an example schematic system block diagram of a multiple codeword MIMO receiver comprising codeword interference cancellation.

Referring now to FIG. 5 illustrates an example schematic system block diagram of a multiple codeword MIMO receiver comprising codeword interference cancellation. FIG. 5 depicts the MIMO receiver with codeword interference cancellation 500, also called serial interference cancellation (SIC), where all of the receiver codewords can be decoded simultaneously. Once the CRC check is performed on the codewords, the codewords whose CRC is a pass can be reconstructed and subtracted from the received signal via an interference cancellation block 502 and only those codewords whose CRC is a fail can be decoded. This process can be repeated until all of the codewords are passed, or all of the codewords are failed, or a certain predetermined number of iterations are reached.

Figure 6:
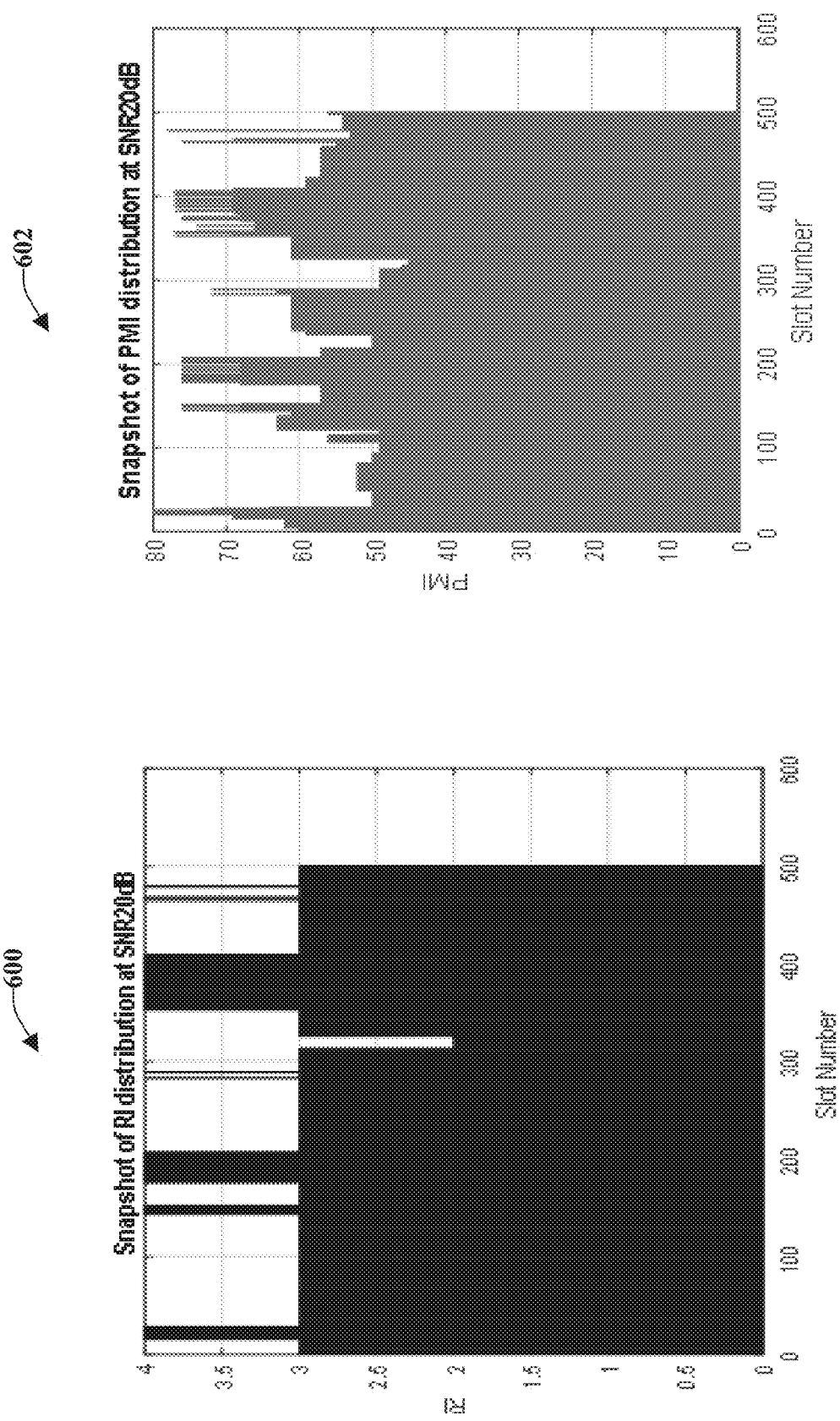
FIG. 6 illustrates an example graph of a rank indicator (RI) distribution over 0.5 milliseconds and a pre-coding matrix indicator (PMI) distribution over 0.5 milliseconds for a 5G network according to one or more embodiments.

Referring now to FIG. 6, illustrated is an example graph of a RI distribution over 0.5 milliseconds and a PMI distribution over 0.5 milliseconds for a 5G network according to one or more embodiments. In general, the RI computed 600 over the whole bandwidth does not change. Similarly, the PMI computed 602 over the whole bandwidth does not change as shown FIG. 6. Consequently, if the UE 102 can compute the CSI using DMRS based channel estimation for the scheduled rank and scheduled PMI, the CQI computed can be similar to that of a CSI-RS based channel estimation. The UE 102 can use channel estimation from DM-RS or PDSCH based channel estimation for computing the CQI. Additionally, the UE 102 can estimate the CSI during the PDSCH decoding time, and the UE 102 can decode the PDSCH and compute the CQI in the same slot for various CSI parameters, wideband CQI, sub band CQI, and/or layer indicator.

Figure 7:
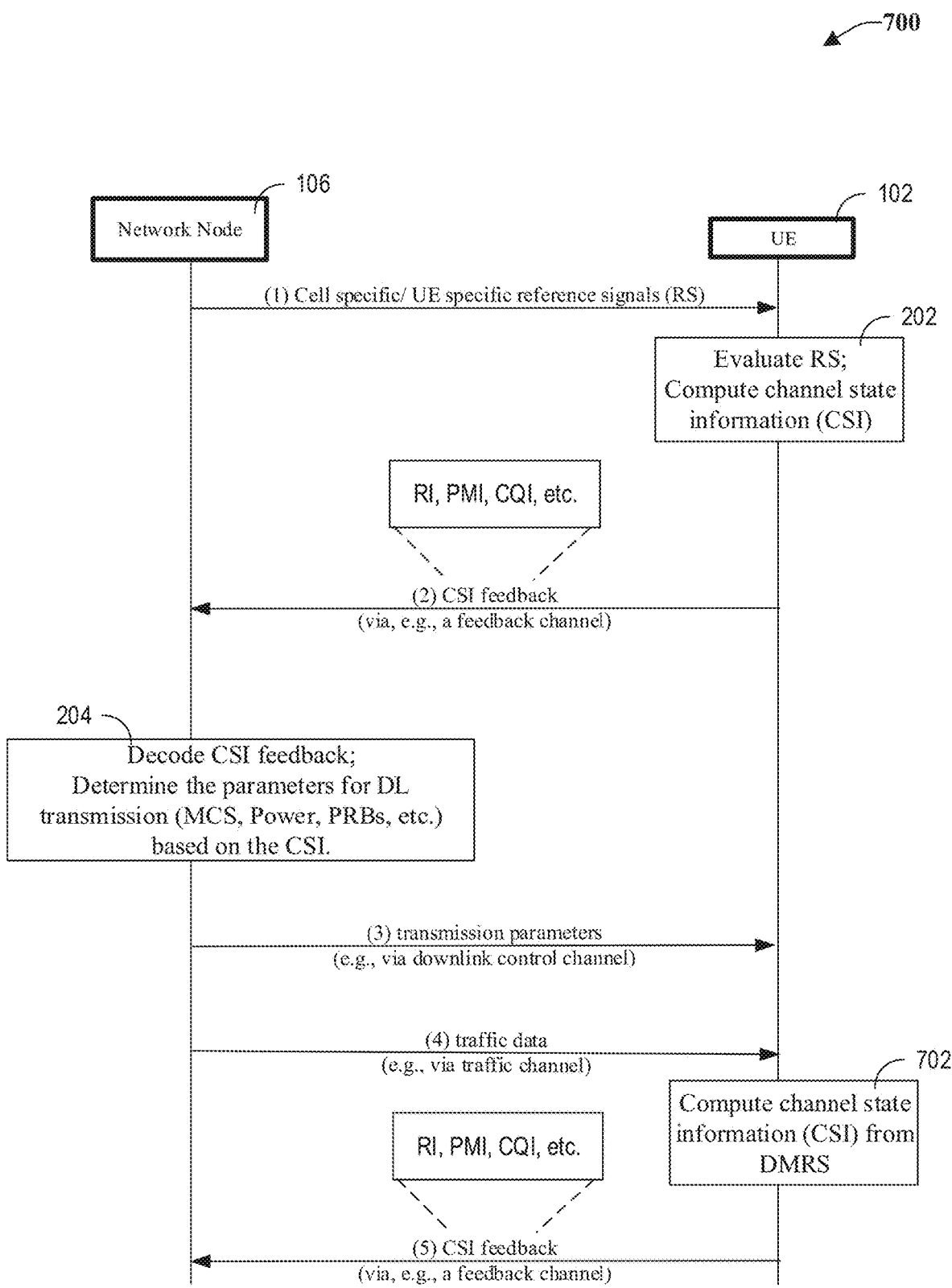
FIG. 7 illustrates an example schematic system block diagram of a message sequence chart between a network node and user equipment using DMRS according to one or more embodiments.

Referring now to FIG. 7, illustrated is an example schematic system block diagram of a message sequence chart between a network node and user equipment using DMRS according to one or more embodiments. Repetitive description of like elements is omitted for the sake of brevity. The following method can be used to estimate the SINR using an advanced receiver. The network node 106 can estimate the channel using DMRS 702 for PDSCH demodulation using the advanced receiver, and send this data to the UE 102 via the feedback channel at transaction (5). The network node 106 can compute the soft bits at the output of the advanced receiver using a maximum likelihood (MML)/maximum a posteriori probability (MAP) metric. From the soft bits, the network node 106 can compute the statistics of soft symbols. For example, the mean and the variance of the soft symbol can be computed as Equation 1 below:

$$\bar{s} = \sum_{s_i \in S} s_i \cdot P(s = s_i) \qquad \text{Equation 1}$$

$$\sigma_s^2 = \left( \sum_{s_i \in S} |s_i|^2 \cdot P(s = s_i) \right) - |\bar{s}|^2$$

where $b_{i,j} \triangleq 2b_{i,j} - 1 \in \{-1, 1\}$ and $\xi_i \triangleq \tanh(\Lambda(b_i)/2)$, and the probability of each symbol in the constellation is computed as Equation 2 below:

$$P(s = s_i) = \prod_{j=1}^{Q} P(b_j = b_{i,j}) \qquad \text{Equation 2}$$

$$= \prod_{j=1}^{Q} \frac{e^{\bar{b}_{i,j} \Lambda(b_j)}}{1 + e^{\bar{b}_{i,j} \Lambda(b_j)}}$$

$$= \prod_{j=1}^{Q} \frac{1 + \bar{b}_{i,j} \xi_j}{2}$$

Once it obtains the symbol probability, the receiver can obtain the noise co-variance as Equation 3 below:

$$\sigma^2 = \sum_{i=1}^{M} |R - HS_i|^2 P \qquad \text{Equation 3}$$

Where R is the received vector per each sub carrier, H is the channel matrix estimated, Si is the symbol for the PDSCH constellation, and P is the probability of the complex symbol computed in Equation 3.

Once the advanced receiver computes the noise covariance, it can compute the SINR as signal power/noise co-variance. In general, signal power can be assumed to be unity for constellation for a quadrature phase-shifting key (QPSK), 16 quadrature amplitude modulation (QAM), 64 QAM, and 256 QAM.

From the SINR, the receiver can map the CQI, which corresponds to a 10% block error rate (BLER) threshold and reports this information to the network (in the case of DL transmission). From the SINR, the network node 106 can map the corresponding modulation and coding scheme (MCS), which corresponds to the 10% threshold, and the network node 106 can schedule the UE 102 with the corresponding MCS (in the case of UL transmission).

Figure 8:
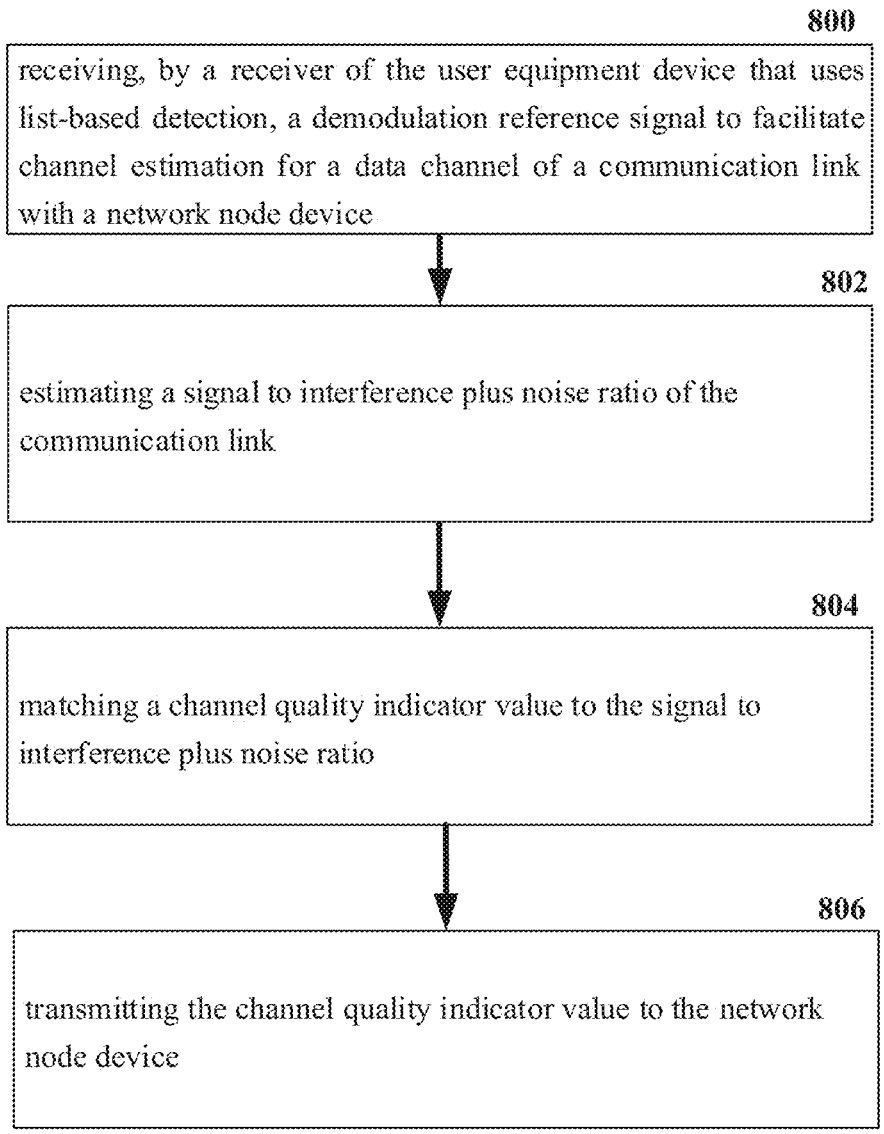
FIG. 8 illustrates an example flow diagram for user equipment device operations for improved MIMO system performance for a 5G network according to one or more embodiments.

Referring now to FIG. 8, illustrated is an example flow diagram for a user equipment device operations for improved MIMO system performance for a 5G network according to one or more embodiments. At element 800, a user equipment device 102 can receive, by a receiver of the user equipment device that uses list-based detection, a demodulation reference signal to facilitate channel estimation for a data channel of a communication link with a network node device 106. At element 802, the user equipment device 102 can estimate a signal to interference plus noise ratio of the communication link. Additionally, at element 804, the user equipment device 102 can match a channel quality indicator value to the signal to interference plus noise ratio. At element 806, the user equipment device 102 can transmit the channel quality indicator value to the network node device 106.

Figure 9:
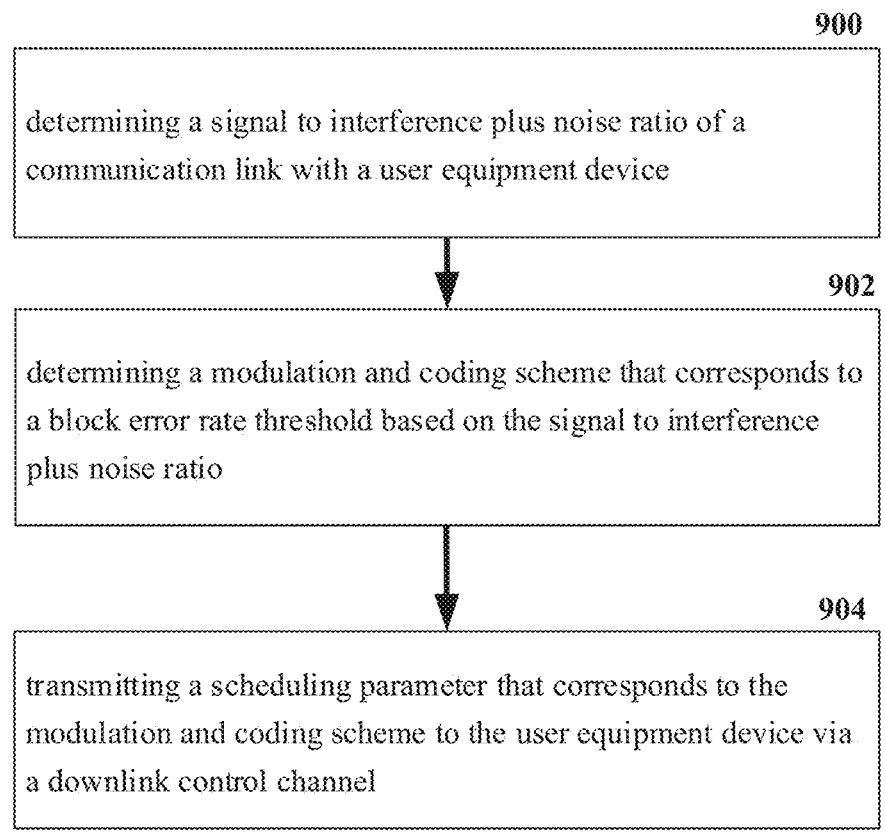
FIG. 9 illustrates an example flow diagram for network device operations for improved MIMO system performance for a 5G network according to one or more embodiments.

Referring now to FIG. 9, illustrates an example flow diagram for a network device operations for improved MIMO system performance for a 5G network according to one or more embodiments. At element 900, a network node device 106 can facilitate determining a signal to interference plus noise ratio of a communication link with a user equipment device 102. Additionally, the network node device 106 can determine a modulation and coding scheme that corresponds to a block error rate threshold based on the signal to interference plus noise ratio at element 902. Furthermore, at element 904, the network node device 106 can transmit a scheduling parameter that corresponds to the modulation and coding scheme to the user equipment device 102 via a downlink control channel.

Figure 10:
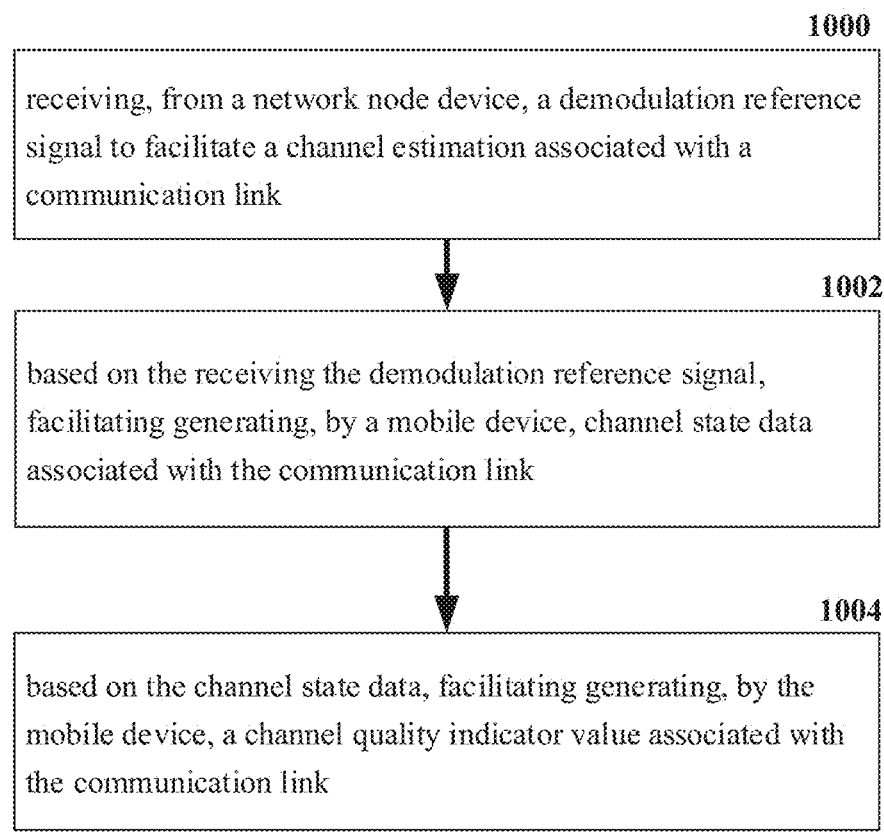
FIG. 10 illustrates an example flow diagram for a system for improved MIMO system performance for a 5G network according to one or more embodiments.

Referring now to FIG. 10, illustrated is an example flow diagram for a system for improved MIMO system performance for a 5G network according to one or more embodiments. At element 1000, a system can facilitate operation comprising receiving from network node device 106, a demodulation reference signal to facilitate a channel estimation associated with a communication link. Based on the receiving the demodulation reference signal, the system can facilitate generating, by a mobile device 102, channel state data associated with the communication link at element 1002. Furthermore, based on the channel state data, the system can facilitate generating, by the mobile device 102, a channel quality indicator value associated with the communication link at element 1004.

Figure 11:
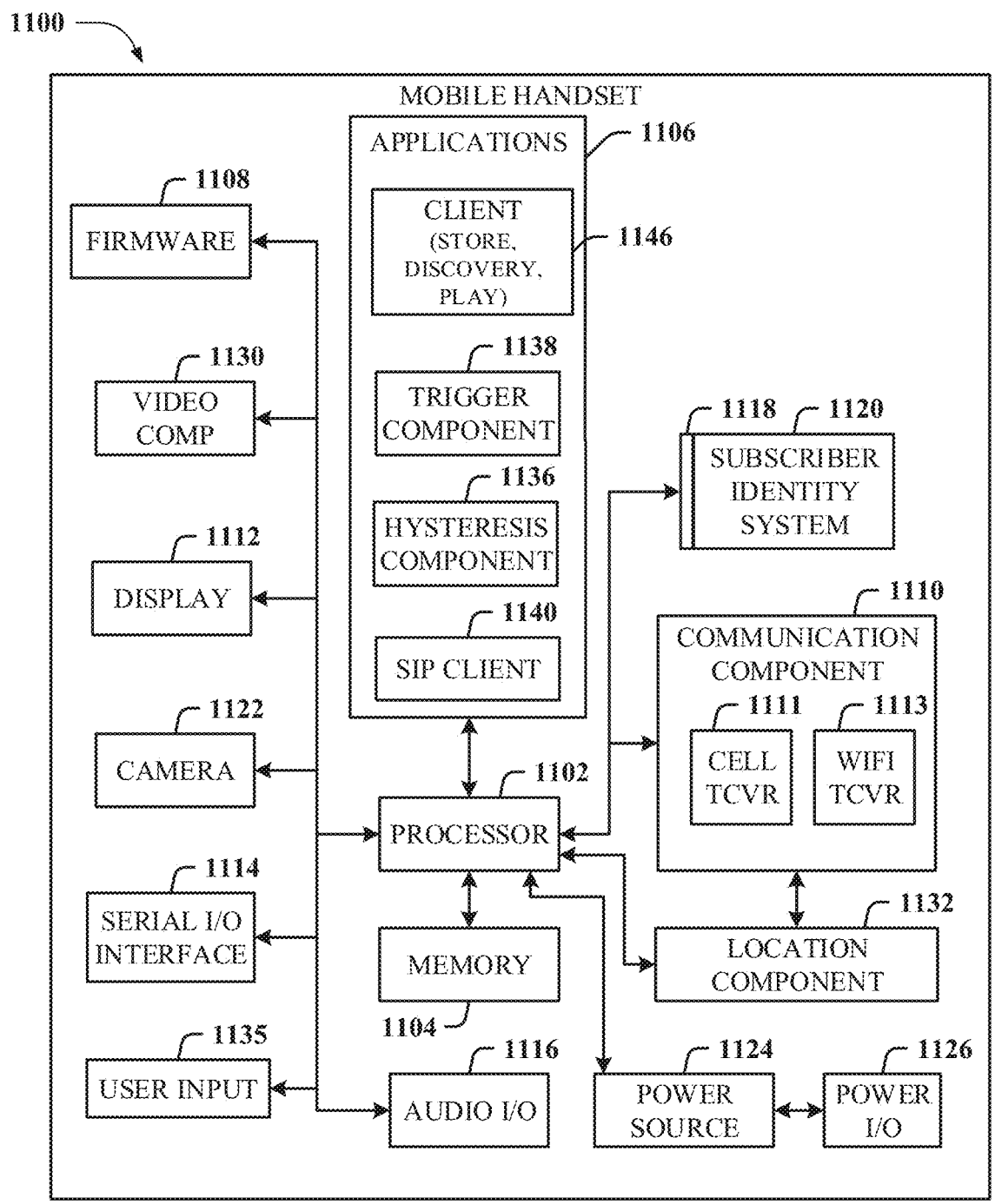
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
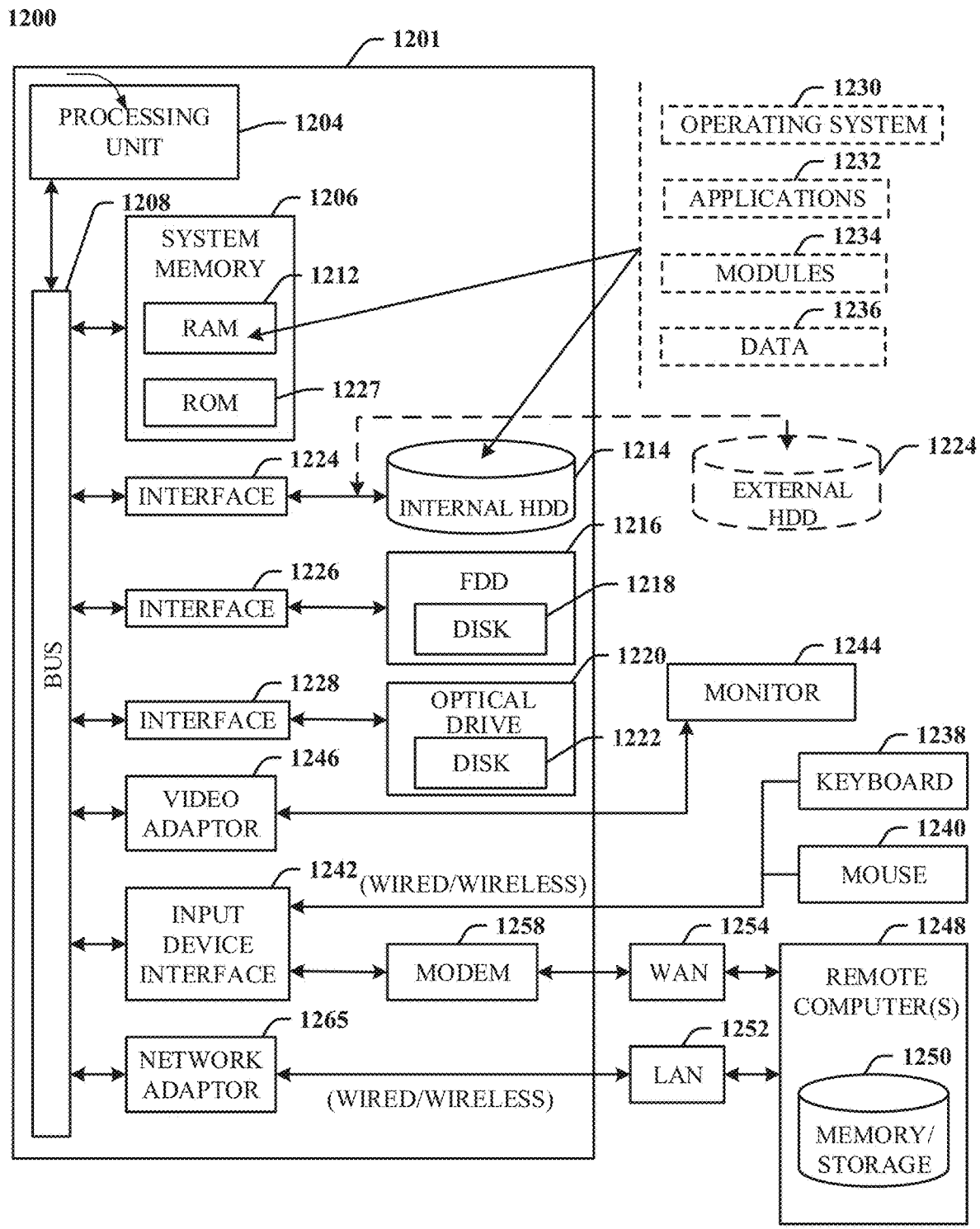
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A user equipment, comprising:
   a processor; and
   a memory that stores executable instructions that, when executed by the processor, facilitate performance of operations, comprising:
   receiving, by a receiver of the user equipment that uses list-based detection, a demodulation reference signal to facilitate channel estimation for a data channel of a communication link with network equipment;
   based on the demodulation reference signal, determining a signal power to noise covariance value for the communication link, comprising:
   determining soft symbols from an output of the receiver of the user equipment,
   determining respective probabilities of the soft symbols, and
   determining a noise covariance based on the respective probabilities;
   employing the signal power to noise covariance value as an estimated signal to interference plus noise ratio for the communication link, comprising:
   matching a channel quality indicator value to the estimated signal to interference plus noise ratio, wherein the channel quality indicator value comprises a layer indicator value representative of a number spatial layers to be transmitted in parallel; and
   transmitting the channel quality indicator value to the network equipment.

2. The user equipment of claim 1, wherein the operations further comprise:
   receiving, from the network equipment, a scheduling parameter based on the channel quality indicator value.

3. The user equipment of claim 1, wherein determining the soft symbols comprises determining the soft symbols using a maximum likelihood metric.

4. The user equipment of claim 1, wherein determining the soft symbols comprises determining the soft symbols using a maximum a posteriori probability metric.

5. The user equipment of claim 1, wherein matching the channel quality indicator value to the estimated signal to interference plus noise ratio is performed concurrently with decoding data received via the data channel.

6. The user equipment of claim 1, wherein the channel quality indicator value is an estimated channel quality indicator value based on the demodulation reference signal.

7. The user equipment of claim 1, wherein the channel quality indicator value comprises a wideband channel quality indicator value.

8. A method, comprising:
   receiving, by a receiver of a user equipment that uses list-based detection, a demodulation reference signal to facilitate channel estimation for a data channel of a communication link with network equipment;
   based on the demodulation reference signal, determining, by the user equipment, a signal power to noise covariance value for the communication link, comprising:
   computing soft symbols based on an output of the receiver of the user equipment,
   computing respective probabilities of the soft symbols, and
   computing a noise covariance based on the respective probabilities;
   employing, by the user equipment for the channel estimation, the signal power to noise covariance value as an estimated signal to interference plus noise ratio for the communication link, comprising:
   selecting a channel quality indicator value based on the estimated signal to interference plus noise ratio; and
   communicating the channel quality indicator value to the network equipment.

9. The method of claim 8, further comprising:
   receiving, by the user equipment from the network equipment, a scheduling parameter based on the channel quality indicator value.

10. The method of claim 9, wherein determining the soft symbols comprises determining the soft symbols using a maximum likelihood metric.

11. The method of claim 9, wherein the determining the soft symbols comprises determining the soft symbols using a maximum a posteriori probability metric.

12. The method of claim 9, wherein determining the respective probabilities of the soft symbols comprises determining respective averages of the soft symbols.

13. The method of claim 9, wherein determining the respective probabilities of the soft symbols comprises determining respective variances of the soft symbols.

14. The method of claim 8, wherein matching the channel quality indicator value to the estimated signal to interference plus noise ratio for the communication link is performed concurrently with decoding data received via the data channel.

15. A non-transitory machine-readable medium, comprising executable instructions that, when executed by a processor of a user equipment, facilitate performance of operations, comprising:
receiving, via a receiver of the user equipment that uses list-based detection, a demodulation reference signal to facilitate channel estimation for a data communication link with network equipment;
based on the demodulation reference signal, determining a signal power to noise covariance value for the data communication link, comprising:
determining soft symbols at an output of the receiver of the user equipment,
determining respective probabilities of the soft symbols, and
determining a noise covariance based on the respective probabilities;
employing the signal power to noise covariance value as an estimated signal to interference plus noise ratio for the data communication link, comprising:
determining a channel quality indicator value based on the estimated signal to interference plus noise ratio; and
sending the channel quality indicator value to the network equipment.

16. The non-transitory machine-readable medium of claim 15, wherein the operations further comprise:
receiving, from the network equipment, a scheduling parameter based on the channel quality indicator value.

17. The non-transitory machine-readable medium of claim 16, wherein determining the soft symbols comprises determining the soft symbols using a maximum likelihood metric.

18. The non-transitory machine-readable medium of claim 16, wherein determining the soft symbols comprises determining the soft symbols using a maximum a posteriori probability metric.

19. The non-transitory machine-readable medium of claim 16, wherein determining the respective probabilities of the soft symbols comprises determining respective means of the soft symbols.

20. The non-transitory machine-readable medium of claim 16, wherein determining the respective probabilities of the soft symbols comprises determining respective variances of the soft symbols.

* * * * *